US010865683B2

(12) United States Patent
Chenoweth et al.

(10) Patent No.: US 10,865,683 B2
(45) Date of Patent: Dec. 15, 2020

(54) AFTERTREATMENT MODULE (71) Applicant: Caterpillar Inc., Deerfield, IL (US)

(72) Inventors: Kurtis Chenoweth, Ipava, IL (US); Mohamed Daoud, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 9 days.

(21) Appl. No.: 16/359,678

(22) Filed: Mar. 20, 2019

(65) Prior Publication Data

US 2020/0300145 A1 Sep. 24, 2020

(51) Int. Cl.
*F01N 3/10* (2006.01)
*F01N 3/28* (2006.01)
*F01N 13/08* (2010.01)
*F01N 11/00* (2006.01)
*B01D 53/94* (2006.01)
*F01N 3/20* (2006.01)

(52) U.S. Cl.
CPC ....... *F01N 3/2839* (2013.01); *B01D 53/9431* (2013.01); *F01N 3/2066* (2013.01); *F01N 3/2892* (2013.01); *F01N 11/002* (2013.01); *F01N 11/007* (2013.01); *F01N 13/082* (2013.01); *F01N 2330/02* (2013.01); *F01N 2610/02* (2013.01); *F01N 2610/1453* (2013.01)

(58) Field of Classification Search
CPC .... F01N 3/2839; F01N 3/2066; F01N 3/2892; F01N 11/002; F01N 11/007; F01N 13/082; B01D 53/9431
USPC .......................................................... 60/295
See application file for complete search history.

(56) References Cited

U.S. PATENT DOCUMENTS

| 8,230,678 | B2 | 7/2012 | Aneja et al. | |
|---|---|---|---|---|
| 8,747,788 | B1 | 6/2014 | Baig et al. | |
| 8,776,509 | B2 * | 7/2014 | Wikaryasz | F01N 3/28 60/324 |
| 9,097,192 | B2 * | 8/2015 | Wang | F02D 41/1441 |
| 9,212,614 | B2 * | 12/2015 | Ancimer | F02D 41/027 |
| 9,593,613 | B2 | 3/2017 | Meier et al. | |
| 9,803,529 | B2 | 10/2017 | Reichert et al. | |
| 9,844,754 | B2 | 12/2017 | Lorenz et al. | |
| 10,591,386 | B2 * | 3/2020 | Schuster | F01N 11/00 |
| 2007/0289294 | A1 * | 12/2007 | Werni | F01N 1/084 60/299 |
| 2014/0251717 | A1 * | 9/2014 | Yasoshina | F01N 1/003 181/211 |

(Continued)

*Primary Examiner* — Jason D Shanske
(74) *Attorney, Agent, or Firm* — Harrity & Harrity LLP (57) ABSTRACT An aftertreatment module is disclosed. The aftertreatment module may include a housing. The aftertreatment module may include a mounting plate within the housing that forms an inlet chamber and an outlet chamber. The aftertreatment module may include an inlet for exhaust gas from a combustion engine to flow into to the inlet chamber. The aftertreatment module may include an outlet through a top plate of the housing. The inlet and the outlet may be located on opposite sides of the housing and at opposite ends of the housing from each other. The aftertreatment module may include a set of catalysts mounted to the mounting plate. The aftertreatment module may include a diffuser plate within the inlet chamber that forms a lower portion of the inlet chamber and an upper portion of the inlet chamber. The diffuser plate may diffuse the exhaust gas through the lower portion.

20 Claims, 5 Drawing Sheets

(56) References Cited

U.S. PATENT DOCUMENTS

2014/0311137 A1* 10/2014 Wikaryasz ............... F01N 3/28
                                                    60/324
2017/0218824 A1    8/2017  Grosch et al.
2018/0313247 A1   11/2018  Bauknecht et al.
2018/0340460 A1   11/2018  Srinivasan

* cited by examiner

AFTERTREATMENT MODULE

TECHNICAL FIELD

The present disclosure relates generally to an aftertreatment module and, more particularly, to an aftertreatment module that includes an inlet and an outlet on opposite sides and at opposite ends of the aftertreatment module.

BACKGROUND

An aftertreatment module is used to treat exhaust gas from a combustion engine of the machine. For example, the aftertreatment module may include a set of catalysts to process the exhaust gas and to convert toxic gases present in the exhaust gas into less toxic or non-toxic gases by catalyzing the exhaust gas. The effectiveness of the aftertreatment module may depend on an amount of time the exhaust gas interacts with the set of catalysts while flowing through the aftertreatment module, an evenness of the distribution of the exhaust gas across the set of catalysts as the exhaust gas is flowing through the aftertreatment module, and/or one or more of a number of other factors.

One attempt at an exhaust gas aftertreatment device for a motor vehicle is disclosed in U.S. Patent Application Publication No. 2017/0218824 that was published on Aug. 3, 2017 ("the '824 publication"). In particular, the '824 publication discloses an exhaust gas aftertreatment device of a motor vehicle, comprising: a catalyst, which is accommodated in a tubular housing which, along its length, has a first end section, a catalyst section, and a connecting section, wherein exhaust gas flows to the connecting section in a direction perpendicular to a central axis of the aftertreatment device, where the exhaust gas flow is divided to flow a first portion centrally to the catalyst and a second portion around the catalyst, wherein the portions are deflected 180° and combined in the first end section, and where the combined portions flow through the catalyst from the first end section to the connecting section.

While the '824 publication may provide an exhaust gas aftertreatment device, where exhaust gas flows to the connecting section in a direction perpendicular to a central axis of the aftertreatment device, where the exhaust gas flow is divided to flow a first portion centrally to the catalyst and a second portion around the catalyst, the '824 publication does not disclose an aftertreatment module that includes an inlet and an outlet on opposite sides and at opposite ends of the aftertreatment module.

The aftertreatment module of the present disclosure solves one or more of the problems set forth above and/or other problems in the art.

SUMMARY

According to some implementations, the present disclosure is related to an aftertreatment module, comprising: a housing; a mounting plate within the housing that forms an inlet chamber on a bottom side of the mounting plate and an outlet chamber on a top side of the mounting plate; an inlet through a bottom plate of the housing for exhaust gas from a combustion engine to flow into to the inlet chamber; an outlet through a top plate of the housing for the exhaust gas to flow from the outlet chamber, wherein the inlet and the outlet are located on opposite sides of the housing and at opposite ends of the housing from each other; a set of catalysts mounted to the mounting plate to facilitate flow of the exhaust gas from the inlet chamber to the outlet chamber; and a diffuser plate within the inlet chamber that forms a lower portion of the inlet chamber and an upper portion of the inlet chamber, wherein the diffuser plate is to diffuse the exhaust gas through the lower portion of the inlet chamber from a first end of the housing at which the inlet is located toward a second end of the housing at which the outlet is located.

According to some implementations, the present disclosure is related to a machine, comprising: a combustion engine; and an aftertreatment module connected to the combustion engine, the aftertreatment module comprising: a housing; an inlet chamber into which exhaust gas from the combustion engine is to flow into the housing via an inlet; an outlet chamber from which the exhaust gas is to flow from the housing via an outlet; wherein the inlet and the outlet are located on opposite sides of the housing and at opposite ends of the housing from each other; a set of catalysts via which the exhaust gas is to flow from the inlet chamber to the outlet chamber, wherein the set of catalysts is mounted to a mounting plate within the housing that separates the inlet chamber from the outlet chamber; and a diffuser plate within the inlet chamber that forms a lower portion of the inlet chamber and an upper portion of the inlet chamber, wherein the diffuser plate is to diffuse the exhaust gas through the lower portion of the inlet chamber from a first end of the housing at which the inlet is located toward a second end of the housing at which the outlet is located.

According to some implementations, the present disclosure is related to an exhaust gas aftertreatment system, comprising: an inlet module mechanically connected to a combustion engine of a machine to receive exhaust gas from the combustion engine; and an aftertreatment module mechanically connected to the inlet module to receive the exhaust gas from the inlet module, the aftertreatment module comprising: a housing; a mounting plate within the housing that forms an inlet chamber on a bottom side of the mounting plate and an outlet chamber on a top side of the mounting plate; an inlet through a bottom plate of the housing for exhaust gas to flow to the inlet chamber from the inlet module; an outlet through a top plate of the housing for the exhaust gas to flow from the outlet chamber, wherein the inlet and the outlet are located on opposite sides of the housing and at opposite ends of the housing from each other; a set of catalysts mounted to the mounting plate to facilitate flow of the exhaust gas from the inlet chamber to the outlet chamber; and a diffuser plate within the inlet chamber that forms a lower portion of the inlet chamber and an upper portion of the inlet chamber, wherein the diffuser plate is to diffuse the exhaust gas through the lower portion of the inlet chamber to diffuse the exhaust gas across an area of the set of catalysts.

DETAILED DESCRIPTION

This disclosure relates to an aftertreatment module. The aftertreatment module has universal applicability to any machine utilizing such an aftertreatment module. The term "machine" may refer to any machine that performs an operation associated with an industry such as, for example, mining, construction, farming, transportation, or any other industry. As some examples, the machine may be a vehicle (e.g., a truck, a car, a locomotive, a boat, and/or the like), a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Moreover, one or more implements may be connected to the machine and driven from an engine connected to the aftertreatment module.

Figure 1:
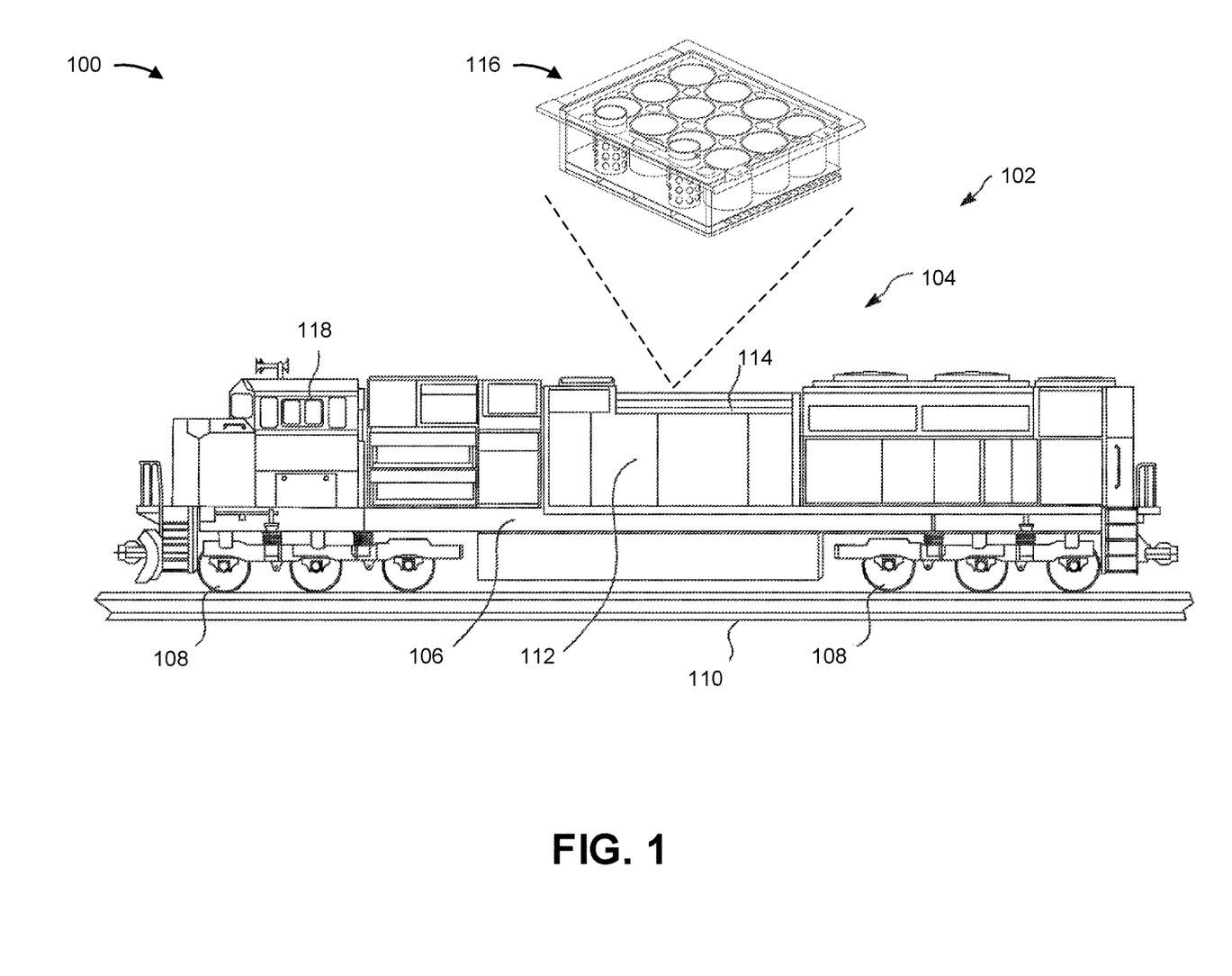
FIG. 1 is a diagram of an example machine that includes an aftertreatment module described herein.

FIG. 1 is a diagram 100 of an example machine that includes an aftertreatment module described herein. Diagram 100 shows an example machine 102. More specifically, the machine 102 is a locomotive 104. The machine 102 may be any other machine described herein.

The locomotive 104 may include a frame 106. The frame 106 may support one or more components of the locomotive 104. The locomotive 104 may include a set of wheels 108 mounted to the frame 106. The wheels 108 may support and provide mobility to the locomotive 104 on a set of rails 110. The locomotive 104 may include an enclosure 112 mounted on the frame 106. The enclosure 112 may house one or more components (not shown) provided on the frame 106 of the locomotive 104.

The locomotive 104 may include an engine 330 (shown in FIG. 3) provided on the frame 106 and within the enclosure 112. The engine 330 may be an internal combustion engine or a gas turbine. The engine 330 may be powered by a fuel such as diesel, gasoline, natural gas, and/or the like. The engine 330 may generate mechanical power for the locomotive 104.

The locomotive 104 may include a generator, or a traction alternator, provided on the frame 106 and within the enclosure 112. The generator may be mechanically coupled to the engine 330. The generator may receive the mechanical power from the engine 330 and may generate electrical power for the locomotive 104.

The locomotive 104 may also include an electric motor, also known as a traction motor, provided on the frame 106 and within the enclosure 112. The electric motor may be electrically coupled to the generator. The electric motor may be further coupled to the wheels 108. The electric motor may receive the electrical power from the generator and may provide motive power to the wheels 108 of the locomotive 104. The locomotive 104 may include a transmission system (not shown) coupled between the electric motor and the wheels 108. The transmission system may include various components such as gears, bearings, shafts, axles, and/or the like. The transmission system may transfer the motive power from the electric motor to the wheels 108.

The locomotive 104 may include various components and/or systems (not shown) provided on the frame 106 and/or within the enclosure 112, such as a fuel delivery system, an air supply system, a cooling system, a lubrication system, an electrical/electronic control system, a rectifier, an inverter, batteries, a safety system, a drive control system, a brake control system, a turbocharger, an exhaust gas recirculation system, a regenerative braking system, peripheries, and/or the like based on a use and/or function of the locomotive 104.

The locomotive 104 may include an exhaust gas aftertreatment system 114 provided on the frame 106 of the machine 102. The exhaust gas aftertreatment system 114 may be coupled to the engine 330. The exhaust gas aftertreatment system 114 may receive exhaust gases generated by the engine 330. The exhaust gas aftertreatment system 114 may treat the exhaust gases before releasing the exhaust gases into the atmosphere. The exhaust gas aftertreatment system 114 may include a number of components (not shown) such as a Diesel Oxidation Catalyst (DOC), a Diesel Particulate Filter (DPF), a reductant injection system, a mixer, a Selective Catalytic Reduction (SCR) unit, and/or the like based on a design of the exhaust gas aftertreatment system 114. Specifically, the exhaust gas aftertreatment system 114 may include an inlet module (not shown in FIG. 1), an aftertreatment module 116, and/or the like described herein.

The locomotive 104 may include an operator cabin 118 provided on the frame 106. The operator cabin 118 may house various controls of the locomotive 104 including levers, pedals, joysticks, buttons, a control interface, audio video devices, a communication system, an operator seat, and/or the like. The controls may be configured to operate and/or control the locomotive 104.

As indicated above, FIG. 1 is provided as an example. Other examples may differ from what is described in connection with FIG. 1.

Figure 2:
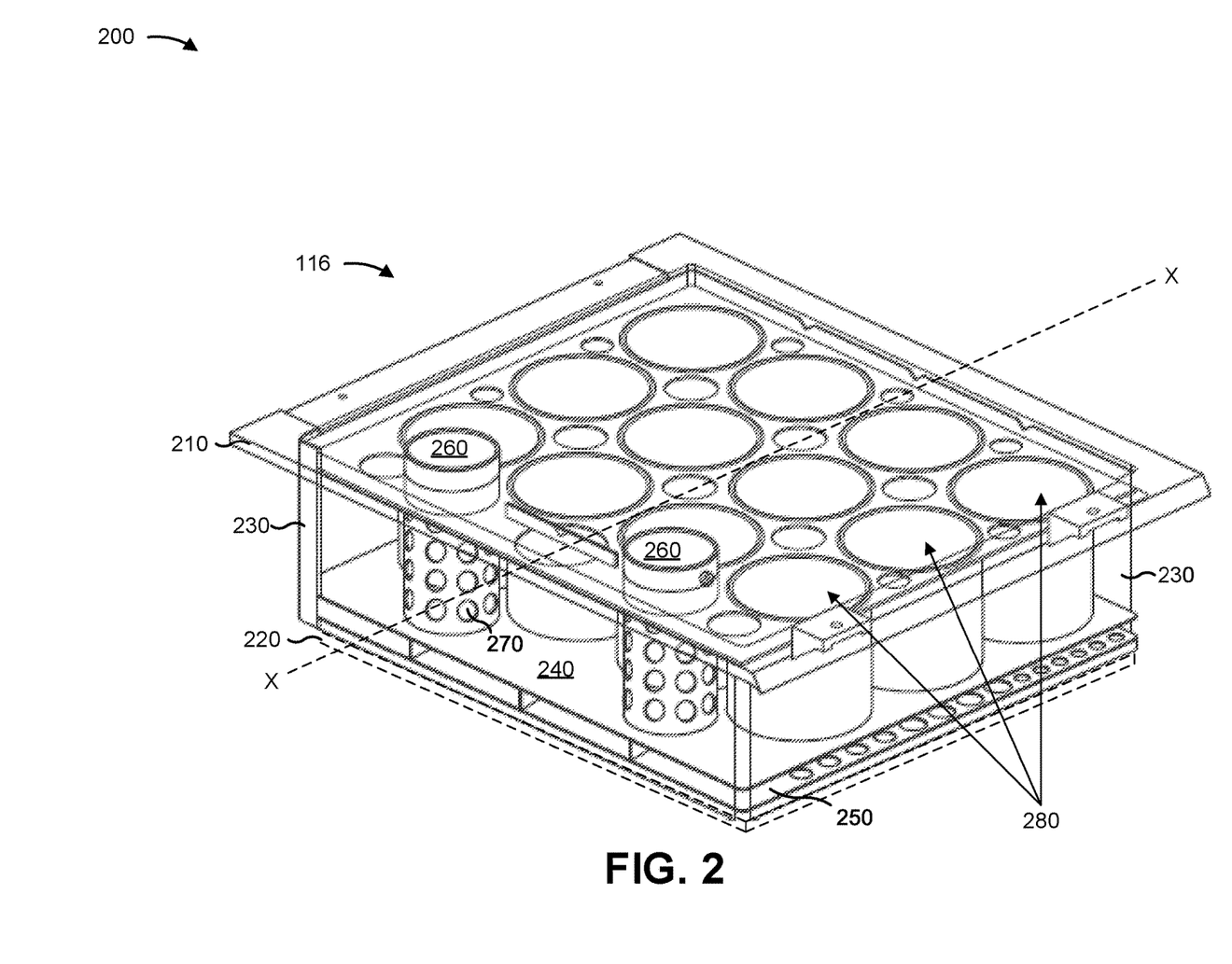
FIG. 2 is a diagram of an example aftertreatment module that may be used with the machine of FIG. 1.

FIG. 2 is a diagram 200 of an example aftertreatment module that may be used with the machine of FIG. 1. FIG. 2 shows a perspective view of the aftertreatment module 116 of the locomotive 104 described in FIG. 1. Specifically, FIG. 2 shows both internal and external components of the aftertreatment module 116.

As shown in FIG. 2, the aftertreatment module 116 may include a top plate 210, a bottom plate 220, and various side plates 230. The top plate 210, the bottom plate 220, and the various side plates 230 may form a housing of the aftertreatment module 116. The housing may be generally air tight, except for inlets and outlets described herein, such as to contain exhaust gas from an engine of the locomotive 104. The bottom plate 220 and/or the various side plates 230 may be plates of other components of the locomotive 104 (e.g., of an inlet module, of the enclosure 112, and/or the like). For example, the bottom plate 220 may in reality be the top plate of an inlet module described elsewhere herein.

As further shown in FIG. 2, the aftertreatment module 116 may include a mounting plate 240 within the housing of the aftertreatment module 116. For example, the mounting plate 240 may form generally air tight seals with the various side plates 230, and as such, may divide an interior of the housing into two chambers (e.g., an inlet chamber and an outlet chamber), described elsewhere herein. One or more other components of the aftertreatment module 116 may be mounted to the mounting plate 240, as described elsewhere herein.

As further shown in FIG. 2, the aftertreatment module 116 may include a diffuser plate 250 (e.g., between the bottom plate 220 and the mounting plate 240). For example, the diffuser plate 250 may be mechanically connected to the various side plates 230 within an inlet chamber formed between the bottom plate 220 and the mounting plate 240 and may divide the inlet chamber into an upper portion and a lower portion, as described elsewhere herein. The diffuser plate 250 may include a plurality of holes via which exhaust gas may flow from the lower portion of the inlet chamber to the upper portion of the inlet chamber after diffusing across the diffuser plate 250.

As further shown in FIG. 2, the aftertreatment module 116 may include a set of outlets 260. In this case, the set of outlets 260 includes two outlets 260, however other quantities of outlets are possible. An outlet 260 may be a pipe (e.g., a tailpipe, as shown in FIG. 2), an opening, and/or the like through the top plate 210 of the housing of the aftertreatment module 116. An outlet 260 may include a plurality of holes 270, such as when the outlet 260 is a pipe or other structure installed through the top plate 210. The plurality of holes 270 may perform sound attenuation during outflow of exhaust gas from the aftertreatment module 116, may facilitate outflow of the exhaust gas from the outlet chamber of the aftertreatment module 116, and/or the like.

As further shown in FIG. 2, the aftertreatment module 116 may include a set of catalysts 280. For example, a catalyst 280 may include a set of catalytic converters, a set of catalyst cylinders, a set of filters, and/or the like associated with processing and/or treating exhaust gas from an engine of the locomotive 104 to convert and/or remove toxic gases in the exhaust gas. The number and/or arrangement of the set of catalysts 280 may depend on a use of the aftertreatment module 116, a targeted extent to which the exhaust gas is to be treated, a configuration of the housing of the aftertreatment module 116, and/or the like. For example, a larger relative housing may include a higher quantity of catalysts 280, a higher quantity of catalysts 280 may be used in a scenario where a greater relative rate of conversion of toxic gases is needed, and/or the like.

The set of catalysts 280 may be mounted to the mounting plate 240. For example, the set of catalysts 280 may be mounted to the mounting plate 240 such that the set of catalysts 280 extend through the mounting plate 240 and such that a respective bottom opening of the set of catalysts 280 is beneath the mounting plate 240 (e.g., in an upper portion of the inlet chamber) and such that a respective top opening of the set of catalysts 280 is above the mounting plate 240 in the outlet chamber. This facilitates flow of exhaust gas from the upper portion of the inlet chamber to the outlet chamber via the set of catalysts 280, as described elsewhere herein.

One or more of the components of the aftertreatment module 116 described herein may comprise metal, plastic, carbon alloy, and/or the like depending on a use of the aftertreatment module 116, temperatures and/or stresses the aftertreatment module 116 is expected to experience during an operating life of the aftertreatment module 116, and/or the like. Axis X-X shown in FIG. 2 is an axis along which a cross-sectional view of the aftertreatment module 116 will be shown below in FIG. 3.

As indicated above, FIG. 2 is provided as an example. Other examples may differ from what is described in connection with FIG. 2.

Figure 3:
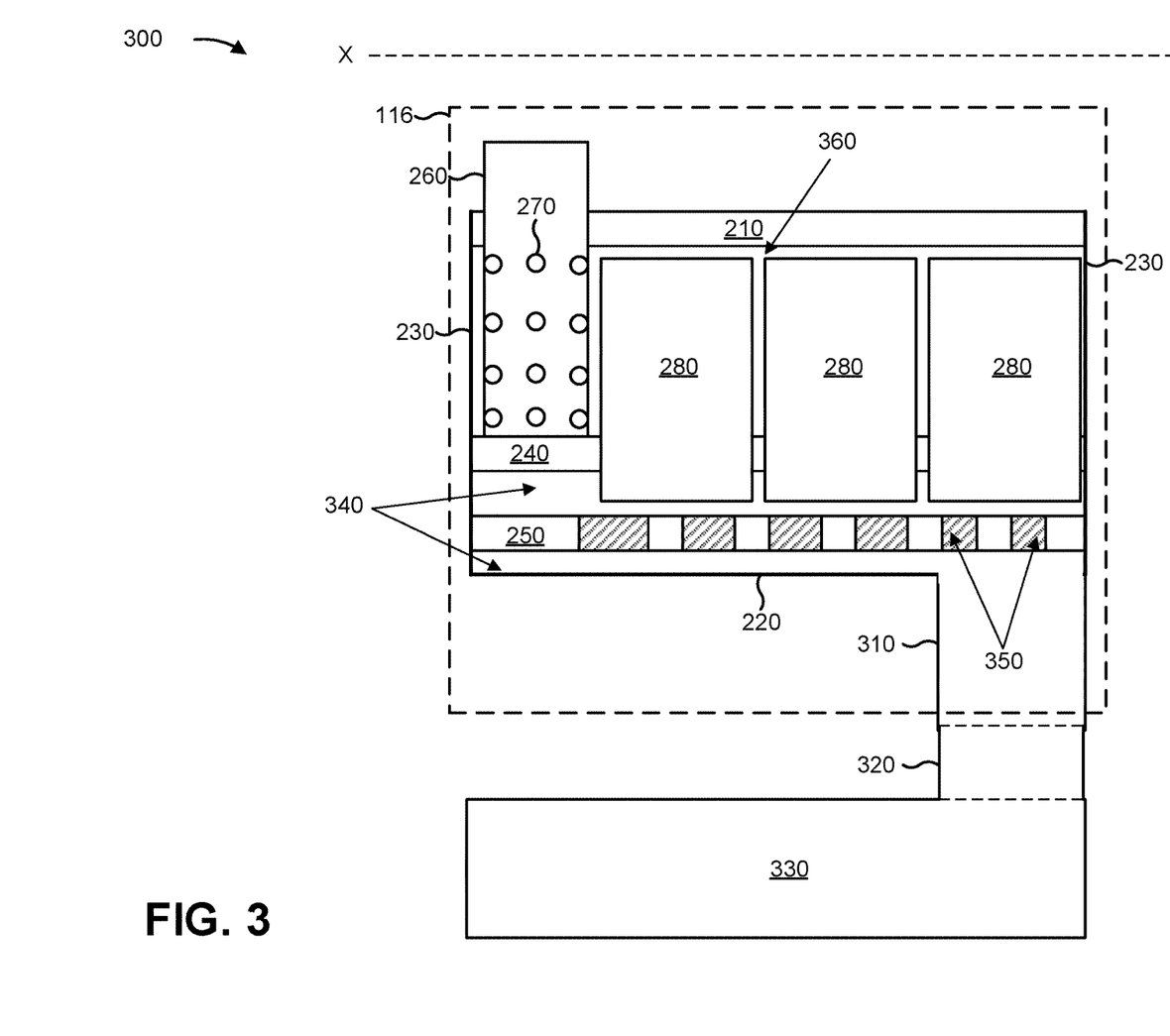
FIG. 3 is a diagram of an example system of the machine of FIG. 1 that includes an aftertreatment module described herein.

FIG. 3 is a diagram 300 of an example system of the machine of FIG. 1 that includes an aftertreatment module described herein. FIG. 3 shows an example exhaust gas aftertreatment system (e.g., exhaust gas aftertreatment system 114 (reference number not shown)) that includes an aftertreatment module 116, an inlet module 320, and an engine 330. FIG. 3 shows a cross section of the housing of the aftertreatment module 116 along axis X-X. As such, FIG. 3 shows a cross section of a top plate 210, a bottom plate 220, various side plates 230, a mounting plate 240, a diffuser plate 250, and an inlet 310. Based on the positioning of axis X-X shown in FIG. 2 above, outlet 260 and the set of catalysts 280 are shown, but not from a cross-sectional perspective. In addition, an inlet module 320 and engine 330 are represented using rectangular shapes and are not necessarily shown as cross-sections.

As shown in FIG. 3, the aftertreatment module 116 may include the inlet 310. The inlet 310 may provide an inlet to the aftertreatment module 116 for exhaust gas. For example, the inlet 310 may provide an inlet into a bottom portion of an inlet chamber of the aftertreatment module 116 from the inlet module 320, as described elsewhere herein. The inlet 310 may be a pipe, an opening, and/or the like through the bottom plate 220 of the aftertreatment module 116.

The inlet 310 may mechanically connect the aftertreatment module 116 to the inlet module 320. For example, the inlet module 320 may include an inlet pipe to receive the exhaust gas from the engine 330, a mixing tube connected to the inlet pipe to mix the exhaust gas with a reductant from a reductant injector, a flow diverter connected to the mixing tube to modify a flow direction of the exhaust gas, and a first outlet from the flow diverter to provide the exhaust gas to the aftertreatment module 116. As further shown in FIG. 3, the inlet module 320 may be mechanically connected to the engine 330. For example, the inlet module 320 may receive the exhaust gas from the engine 330, and may provide the exhaust gas to the aftertreatment module 116 via the inlet 310.

Reference number 340 shows an inlet chamber of the aftertreatment module 116, and specifically an upper portion of the inlet chamber (e.g., above the diffuser plate 250) and a lower portion of the inlet chamber (e.g., below the diffuser plate 250), as described elsewhere herein. For example, the diffuser plate 250 may cause diffusion of the exhaust gas throughout an entire length of the lower portion of the diffuser plate 250 so that when the exhaust gas flows through holes 350 in the diffuser plate 250 to the upper portion, the exhaust gas may have a more even distribution across the set of catalysts 280. The holes 350 in the diffuser plate 250 may have varying diameters across the diffuser plate 250. For example, the holes may have a pattern of increasing diameter (e.g., a pattern of decreasing resistance from a right side of FIG. 3 to a left side of FIG. 3, from a first end of the diffuser plate 250 closest to the inlet 310 to a second end of the diffuser plate 250 furthest from the inlet 310, and/or the like). This facilitates diffusion of the exhaust gas from an end of the diffuser plate 250 closest to the inlet 310 toward an end of the diffuser plate 250 furthest from the inlet 310. Other patterns of sizes of holes 350 are possible. For example, the diameters of the holes 350 may be the same size, may have a pattern of increasing resistance from an end of the diffuser plate 250 closest to the inlet 310 to an end of the diffuser plate 250 furthest from the inlet 310, may have a pattern of alternating increasing and decreasing resistances, and/or the like.

Reference number 360 shows an outlet chamber within a housing of the aftertreatment module 116. For example, the outlet chamber may be between the top plate 210 and the mounting plate 240. As further shown in FIG. 3, the set of catalysts 280 may be mounted to the mounting plate 240 such that a respective bottom opening of the set of catalysts 280 are in the upper portion of the inlet chamber (shown in association with reference number 340), and a respective top opening of the set of catalysts 280 are in the outlet chamber (shown in association with reference number 360). This facilitates pass through of the exhaust gas from the upper portion of the inlet chamber to the outlet chamber via the set of catalysts 280, thereby facilitating interaction of the exhaust gas with the set of cylinders 280 as the exhaust gas flows from the inlet chamber to the outlet chamber. The flow of exhaust gas through the aftertreatment module 116 is described in more detail below.

As indicated above, FIG. 3 is provided as an example. Other examples may differ from what is described in connection with FIG. 3.

Figure 4:
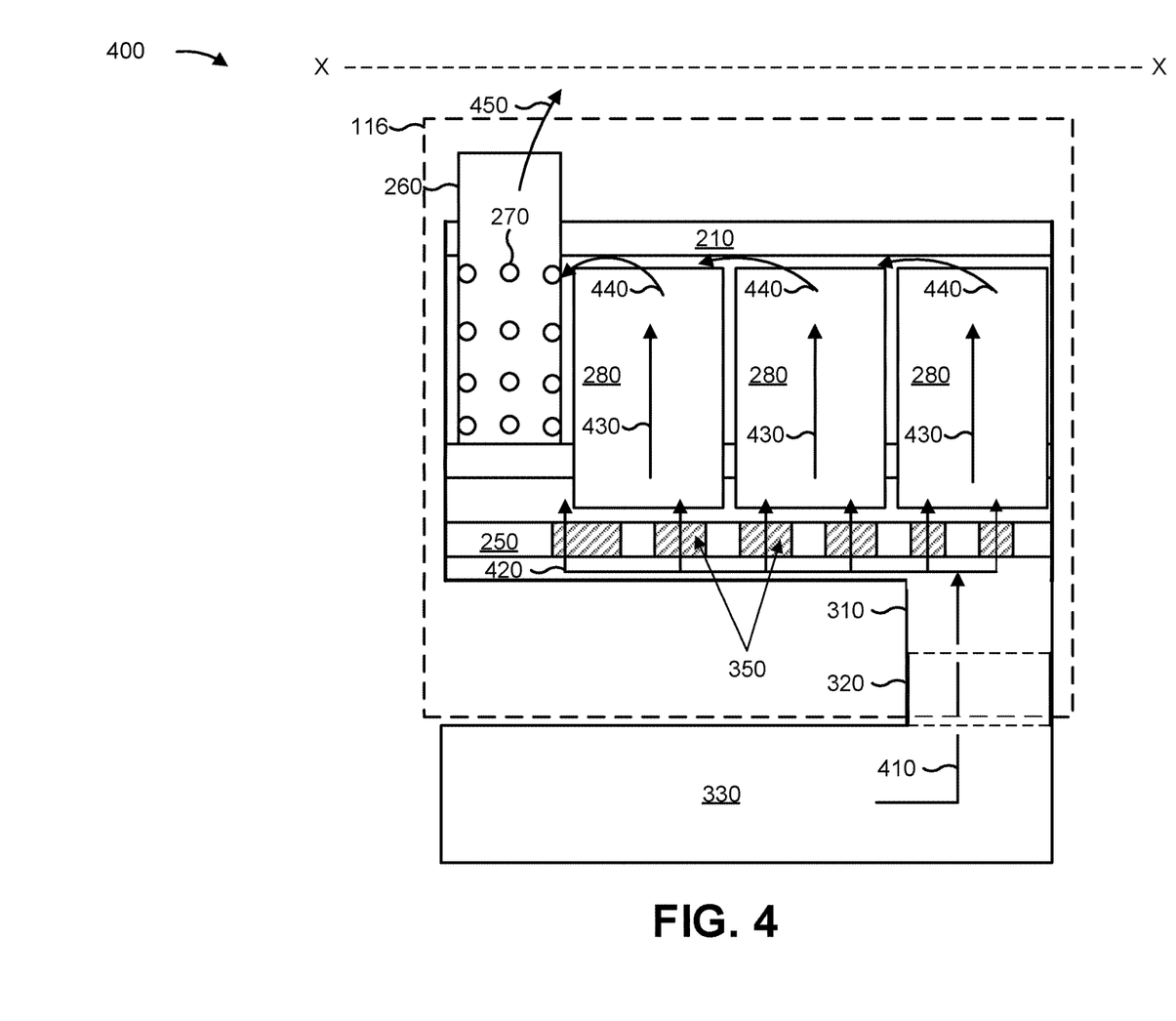
FIG. 4 is a diagram of an example flow pattern of exhaust gas through the system of FIG. 3.

FIG. 4 is a diagram 400 of an example flow pattern of exhaust gas through the system of FIG. 3. For example, FIG. 4 shows various flow paths via which exhaust gas may flow through the exhaust gas aftertreatment system 114 (reference number not shown).

As shown by reference number 410, the exhaust gas may flow from the engine 330 into the inlet module 320. The exhaust gas may flow through various components of the inlet module 320, and the various components may perform various operations on the exhaust gas as described elsewhere herein. The exhaust gas may exit the inlet module 320 and may flow into the inlet 310 of the aftertreatment module 116. As shown by reference number 420, after flowing into the inlet 310, the exhaust gas may flow into a lower portion of an inlet chamber of the aftertreatment module 116 and may diffuse across the diffuser plate 250. The exhaust gas may flow through holes 350 (reference number not shown in FIG. 4) as the gas diffuses across the diffuser plate 250. The exhaust gas may flow into the upper portion of the inlet chamber after flowing thought the holes 350.

As shown by reference numbers 430, the exhaust gas may flow from the upper portion of the inlet chamber through the set of catalysts 280. For example, the exhaust gas may flow into the set of catalysts 280 via a respective bottom opening of the set of catalysts 280 and may flow vertically through the set of catalysts 280. While flowing through the set of catalysts 280, the exhaust gas may undergo conversion and/or the like by the set of catalysts 280. As shown by reference numbers 440, the exhaust gas may flow through a respective top opening of the set of catalysts 280 into the outlet chamber. In the outlet chamber, the gas may flow into the holes 270 of outlet 260. As shown by reference number 450, the exhaust gas may flow out of the aftertreatment module 116 via the outlet 260 and into the atmosphere.

With respect to diffuser plate 250 and the set of catalysts 280, the exhaust gas may generally flow through a particular catalyst 280 associated with holes 350 via which the exhaust gas flowed from the lower portion of the inlet chamber to the upper portion of the inlet chamber. For example, exhaust gas that diffuses to a left most end of the diffuser plate 250 will generally flow vertically after flowing through the left most holes 350 and will likely flow through the left most catalyst 280. Similarly, exhaust gas that flows through the right most holes 350 shown in FIG. 3 will generally flow vertically through the right most catalyst 280. Despite these two different flow paths through different holes 350 and catalysts 280, the exhaust gas that travels on either of these two flow paths may travel a similar distance from the inlet 310 to the outlet 260 based on the configuration of the aftertreatment module 116 shown in FIG. 3. For example, although exhaust gas that flows through the left most holes 350 and the left most catalyst 280 may have a longer distance to travel within the lower portion of the inlet chamber than exhaust gas that flows through the right most holes 350 and the right most catalyst 280, the exhaust gas that flows through the right most holes 350 and the right most catalyst 280 will have a longer distance to travel to the outlet 260 upon flowing out of the right most catalyst 280 relative to the exhaust gas that flows out of the left most catalyst 280. These differences in travel distance through different portions of the aftertreatment module 116 may balance out such that two different lengths of two different flow paths through the aftertreatment module 116 are approximately equal. This results in more equal coefficients of pressure loss for different flow paths through the system relative to other configurations of aftertreatment modules, thereby resulting in a more even distribution of exhaust across the set of catalysts 280 (which improves a conversion of the exhaust gas relative to the other aftertreatment modules).

As indicated above, FIG. 4 is provided as an example. Other examples may differ from what is described in connection with FIG. 4.

Figure 5:
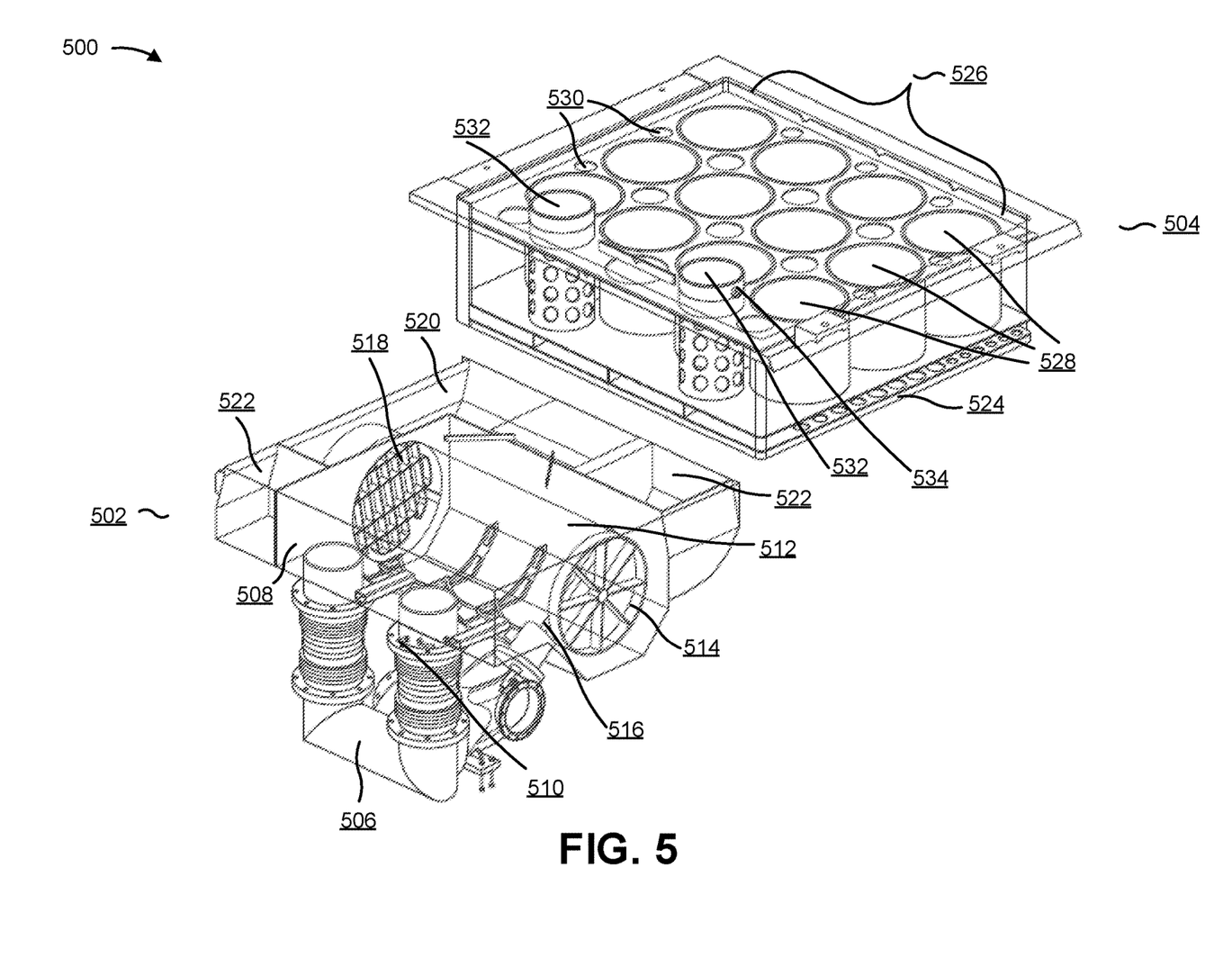
FIG. 5 is a diagram of an example exhaust gas aftertreatment system described herein.

FIG. 5 is a diagram of an example exhaust gas aftertreatment system 500 that includes an inlet module 502 and an aftertreatment module 504. The exhaust gas aftertreatment system 500 may be similar to the exhaust gas aftertreatment system 114 described elsewhere herein (e.g., the inlet module 502 may be similar to an inlet module 320 described elsewhere herein, the aftertreatment module 504 may be similar to an aftertreatment module 116 described elsewhere herein, and/or the like). The exhaust gas aftertreatment system 500 may be assembled such that the inlet module 502 is coupled to the aftertreatment module 504 (e.g., using one or more fasteners, flanges, and/or the like) and the aftertreatment module 504 is disposed on the inlet module 502. In some implementations, the exhaust gas aftertreatment system 500 is included in a package that has dimensions of approximately 1.332 meters by approximately 1.078 meters by approximately 1.510 meters. In such a package, the inlet module 502 and the aftertreatment module 504 may have a combined volume of 200 liters to 400 liters. Additionally, or alternatively, the aftertreatment module 504 may have a volume range of approximately 133 liters to 400 liters.

The exhaust gas aftertreatment system 500 may treat the exhaust gas that exits an exhaust manifold of an engine. The exhaust gas aftertreatment system 500 may connect to the engine via one or more conduits, hoses, and/or the like. For example, an inlet pipe 506 of the inlet module 502 may connect to an exhaust conduit (not shown) of the engine. As shown in FIG. 5, the inlet pipe 506 may be a y-pipe (e.g., a pipe with a single inlet and two outlets) that allows the exhaust gas to flow into a first section 508 of the inlet module 502. The y-pipe configuration for the inlet pipe 506 may reduce backpressure on the inlet pipe 506 and/or the first section 508 as the exhaust gas flows through the inlet pipe 506 into the first section 508.

One or more inlet sensors 510 may be connected to the inlet pipe 506. For example, a respective inlet sensor 510 may be attached to each arm of y-pipe inlet pipe 506. An inlet sensor 510 may detect an amount of nitrogen oxide (e.g., a concentration percentage of nitrogen oxide) in the exhaust gas, a temperature of the exhaust gas, a pressure associated with the exhaust gas (e.g., a pressure caused by the exhaust gas flowing through the inlet pipe 506, a backpressure caused by the exhaust gas flowing through the inlet pipe 506, and/or the like), and/or the like as the exhaust gas enters exhaust gas aftertreatment system 500. An inlet sensor 510 may send information relating to the amount of nitrogen oxide in the exhaust gas, the temperature of the exhaust gas, the pressure associated with the exhaust gas, and/or the like, as the exhaust gas enters exhaust gas aftertreatment system 500 to a controller (not shown) associated with the engine system to affect operation of the engine (e.g. cause the engine to operate in a manner that affects the amount of nitrogen oxide in the exhaust gas, the temperature of the exhaust gas, the pressure associated with the exhaust gas, and/or the like).

The inlet module 502 may include a mixing tube 512 within the first section 508 (e.g., as shown in FIG. 5, suspended by one or more structural ribs in the first section 508). The mixing tube 512 may have a cross section that is circular, oval, elliptical, oblong, and/or the like. After the exhaust gas enters the first section 508, the exhaust gas may flow around an exterior surface of the mixing tube 512 and may enter an inlet end of the mixing tube 512 via flow diverter 514. The flow diverter 514 may be connected to the mixing tube 512 at the inlet end of the mixing tube 512. The flow diverter 514 may affect a direction of a flow of the exhaust gas as the exhaust gas enters the mixing tube 512.

A reductant injector 516 may be connected to the mixing tube 512 at the inlet end of the mixing tube 512 (e.g., next to the flow diverter 514). The reductant injector 516 may inject a liquid reductant, such as a diesel exhaust fluid (DEF), into the mixing tube 512. The reductant may include urea, ammonia, and/or the like. The reductant injector 516 may be connected to a pump (not shown) that facilitates the reductant injector 516 injecting the reductant into the mixing tube 512 (e.g., the pump creates pressure to assist the reductant injector 516 projecting an atomized mist of the reductant in the mixing tube 512). As the exhaust gas and the reductant flow through the mixing tube to an outlet end of the mixing tube 512, the exhaust gas and the reductant may mix together (e.g., ammonia particles of the reductant may mix with nitrogen oxide particles of the exhaust gas). A mixer assembly 518 may be connected to the mixing tube 512 at the outlet end of the mixing tube 512. The mixer assembly 518 may include one or more components that facilitate further mixing of the reductant and the exhaust gas. The mixer assembly 518 may include a flapper style mixer, a swirl plate mixer, and/or the like.

After flowing through the mixing tube 512, the exhaust gas may exit the outlet end of the mixing tube 512 and may flow into a second section 520. Second section 520 may include one or more walls for changing the direction of flow of the exhaust gas as the exhaust gas flows through the second section 520, which facilitates greater mixing of the reductant and the exhaust gas before the exhaust gas flows into the aftertreatment module 504. For example, the second section 520 may include one or more walls that cause the direction of flow of the exhaust gas to change by 180 degrees (e.g., two 90 degree changes) as the exhaust gas flows through the second section 520.

As shown in FIG. 5, the inlet module 502 may include one or more sound attenuation sections 522. The one or more sound attenuation sections 522 may be designed to attenuate a sound frequency range associated with operation of the engine. The one or more sound attenuation sections 522 may be designed to reduce a noise level associated with operation of the engine (e.g., to reduce the noise level by a particular amount of decibels (dBA), such as 10 dBA to 30 dBA). The one or more sound attenuation sections 522 may be adjacent to the first section 508 and/or the second section 520.

The aftertreatment module 504 may include a diffuser plate 524 similar to diffuser plate 250 described elsewhere herein (e.g., may distribute the exhaust gas as the exhaust gas flows from the second section 520 of the inlet module 502). The diffuser plate 524 may include a plurality of holes (e.g., similar to holes 350 described elsewhere herein) via which the exhaust gas can traverse when flowing from the inlet module 502 to the aftertreatment module 504.

The aftertreatment module 504 may include a set of catalysts 526 that includes one or more catalysts 528 similar to catalyst 280 described elsewhere herein. In some implementations, the one or more catalysts 528 may have a height between 15 centimeters (cm) and 50 cm. The set of catalysts 526 may include one or more perforations 530 (e.g., one or more spaces between the one or more catalysts 528), such that after the exhaust gas exits an outlet end of the one or more catalysts 528, the exhaust gas flows to one or more outlets 532 (similar to outlet 260 described elsewhere herein) via the one or more perforations 530.

One or more outlet sensors 534 may respectively be connected to the one or more outlets 532. For example, a respective outlet sensor 534 may be attached to each outlet 532. An outlet sensor 534 may detect an amount of nitrogen oxide (e.g., a concentration percentage of nitrogen oxide) in the exhaust gas, a temperature of the exhaust gas, a pressure associated with the exhaust gas (e.g., a pressure caused by the exhaust gas flowing through the outlet 532, a backpressure caused by the exhaust gas flowing through the outlet 532, and/or the like), and/or the like as the exhaust gas exits the exhaust gas aftertreatment system 500. An outlet sensor 534 may send information relating to the amount of nitrogen oxide in the exhaust gas, the temperature of the exhaust gas, the pressure associated with the exhaust gas, and/or the like as the exhaust gas exits the exhaust gas aftertreatment system 500 to a controller (not shown) associated with the engine to affect operation of the engine system (e.g., to cause the engine to operate in a manner that affects the amount of nitrogen oxide in the exhaust gas, the temperature of the exhaust gas, the pressure associated with the exhaust gas, and/or the like).

As indicated above, FIG. 5 is provided as an example. Other examples may differ from what was described in connection with FIG. 5.

INDUSTRIAL APPLICABILITY

The disclosed after treatment module (e.g., an aftertreatment module 116, an aftertreatment module 504, and/or the like) may be used with any machine where such an aftertreatment module is needed. The aftertreatment module may be configured with an inlet through a bottom plate of the aftertreatment module and an outlet through a top plate of the aftertreatment module. As such, the inlet and the outlet may be on opposite sides of the aftertreatment module. In addition, the inlet may be located at a first end of the aftertreatment module and the outlet may be located at a second end of the aftertreatment module that is an opposite end from the first end. Further, the aftertreatment module may include a diffuser plate to diffuse exhaust gas through an inlet chamber upon the exhaust gas flowing into the aftertreatment module.

This configuration of components of the aftertreatment module results in two respective coefficients of pressure loss of two different flow paths through the aftertreatment module being approximately equal to each other (e.g., a first coefficient of pressure loss may be within 10 percent of a second coefficient of pressure loss). This results in more even coefficients of pressure loss of different flow paths through the aftertreatment module, thereby resulting in a more even distribution of exhaust gas through various chambers of the aftertreatment module. Having a more even distribution of exhaust gas through the various chambers of the aftertreatment module results in a more efficient and/or more thorough conversion of toxic gases in the exhaust gas. This improves a quality of the exhaust gas that is ultimately released into the atmosphere relative to other aftertreatment modules.

As used herein, the articles "a" and "an" are intended to include one or more items, and may be used interchangeably with "one or more." Also, as used herein, the terms "has,"

"have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. An aftertreatment module, comprising:
   a housing;
   a mounting plate within the housing that forms an inlet chamber on a bottom side of the mounting plate and an outlet chamber on a top side of the mounting plate;
   an inlet through a bottom plate of the housing for exhaust gas from a combustion engine to flow into the inlet chamber,
      wherein the inlet chamber is between the mounting plate and the inlet;
   an outlet through a top plate of the housing for the exhaust gas to flow from the outlet chamber,
      wherein the inlet and the outlet are located on opposite sides of the housing and at opposite ends of the housing from each other;
   a set of catalysts mounted to the mounting plate to facilitate flow of the exhaust gas from the inlet chamber to the outlet chamber; and
   a diffuser plate within the inlet chamber that forms a lower portion of the inlet chamber and an upper portion of the inlet chamber,
      wherein the diffuser plate is to diffuse the exhaust gas through the lower portion of the inlet chamber from a first end of the housing at which the inlet is located toward a second end of the housing at which the outlet is located.

2. The aftertreatment module of claim 1, wherein the aftertreatment module is connected to the combustion engine via an inlet module.

3. The aftertreatment module of claim 1, wherein the diffuser plate includes a plurality of holes across the diffuser plate,
   wherein diameters of the plurality of holes vary across the diffuser plate.

4. The aftertreatment module of claim 3, wherein the diameters of the plurality of holes have a decreasing resistance pattern from the first end of the housing toward the second end of the housing.

5. The aftertreatment module of claim 3, wherein a subset of the plurality of holes is aligned with each of the set of catalysts.

6. The aftertreatment module of claim 1, wherein the outlet is a tailpipe that includes a plurality of holes for sound attenuation and to facilitate flow of the exhaust gas from the outlet chamber.

7. The aftertreatment module of claim 1, wherein the aftertreatment module has at least two flow paths for the exhaust gas through the aftertreatment module based on the set of catalysts including at least two catalysts.

8. A machine, comprising:
   a combustion engine; and
   an aftertreatment module connected to the combustion engine, the aftertreatment module comprising:
      a housing;
      an inlet chamber into which exhaust gas from the combustion engine is to flow into the housing via an inlet;
      an outlet chamber from which the exhaust gas is to flow from the housing via an outlet;
         wherein the inlet and the outlet are located on opposite sides of the housing and at opposite ends of the housing from each other;
      a set of catalysts via which the exhaust gas is to flow from the inlet chamber to the outlet chamber,
         wherein the set of catalysts is mounted to a mounting plate within the housing that separates the inlet chamber from the outlet chamber, and
         wherein the inlet chamber is between the mounting plate and the inlet; and
      a diffuser plate within the inlet chamber that forms a lower portion of the inlet chamber and an upper portion of the inlet chamber,
         wherein the diffuser plate is to diffuse the exhaust gas through the lower portion of the inlet chamber from a first end of the housing at which the inlet is located toward a second end of the housing at which the outlet is located.

9. The machine of claim 8, further comprising:
   an inlet module between the combustion engine and the aftertreatment module,
      wherein the aftertreatment module is to receive the exhaust gas from the combustion engine via the inlet module,
      wherein the inlet module is associated with mixing a reductant with the exhaust gas.

10. The machine of claim 8, wherein two respective coefficients of pressure loss of two different flow paths through the aftertreatment module are approximately equal to each other.

11. The machine of claim 8, wherein the exhaust gas is to flow:
   from the combustion engine into the lower portion of the inlet chamber via the inlet,
   across the diffuser plate after entering the lower portion of the inlet chamber,
   from the lower portion of the inlet chamber into the upper portion of the inlet chamber via the diffuser plate,
   from the upper portion of the inlet chamber into the set of catalysts through bottom openings of the set of catalysts,
   from the set of catalysts into the outlet chamber through top openings of the set of catalysts, and
   from the outlet chamber through the outlet to be output from the aftertreatment module.

12. The machine of claim 8, wherein two respective lengths of two different flow paths through the aftertreatment module are approximately equal two each other.

13. The machine of claim 8, wherein the aftertreatment module further comprises:
   an outlet sensor mounted on the outlet,
      wherein the outlet sensor is to:

obtain information relating to an amount of nitrogen oxide in the exhaust gas, a temperature of the exhaust gas, or a pressure associated with the exhaust gas; and cause a modification in operation of the machine based on the information.

14. The machine of claim 8, wherein the machine is a locomotive.

15. An exhaust gas aftertreatment system, comprising:
an inlet module mechanically connected to a combustion engine of a machine to receive exhaust gas from the combustion engine; and
an aftertreatment module mechanically connected to the inlet module to receive the exhaust gas from the inlet module, the aftertreatment module comprising:
a housing;
a mounting plate within the housing that forms an inlet chamber on a bottom side of the mounting plate and an outlet chamber on a top side of the mounting plate;
an inlet through a bottom plate of the housing for exhaust gas to flow to the inlet chamber from the inlet module,
wherein the inlet chamber is between the mounting plate and the inlet;
an outlet through a top plate of the housing for the exhaust gas to flow from the outlet chamber,
wherein the inlet and the outlet are located on opposite sides of the housing and at opposite ends of the housing from each other;
a set of catalysts mounted to the mounting plate to facilitate flow of the exhaust gas from the inlet chamber to the outlet chamber; and
a diffuser plate within the inlet chamber that forms a lower portion of the inlet chamber and an upper portion of the inlet chamber,
wherein the diffuser plate is to diffuse the exhaust gas through the lower portion of the inlet chamber to diffuse the exhaust gas across an area of the set of catalysts.

16. The exhaust gas aftertreatment system of claim 15, wherein the lower portion of the inlet chamber is formed with the top plate of the housing.

17. The exhaust gas aftertreatment system of claim 15, wherein the diffuser plate includes a plurality of holes to facilitate flow of the exhaust gas from the lower portion of the inlet chamber to the upper portion of the inlet chamber.

18. The exhaust gas aftertreatment system of claim 17, wherein the plurality of holes has a pattern of increasing diameter from a first end of the diffuser plate associated with the inlet to a second end of the diffuser plate associated with the outlet.

19. The exhaust gas aftertreatment system of claim 15, wherein the exhaust gas is to flow:
from the combustion engine into the lower portion of the inlet chamber via the inlet,
across the diffuser plate after entering the lower portion of the inlet chamber,
from the lower portion of the inlet chamber into the upper portion of the inlet chamber via the diffuser plate,
from the upper portion of the inlet chamber into the set of catalysts through bottom openings of the set of catalysts,
from the set of catalysts into the outlet chamber through top openings of the set of catalysts, and
from the outlet chamber through the outlet to be output from the aftertreatment module.

20. The exhaust gas aftertreatment system of claim 15, wherein the inlet module comprises:
an inlet pipe to receive the exhaust gas from the combustion engine,
a mixing tube connected to the inlet pipe to mix the exhaust gas with a reductant from a reductant injector,
a flow diverter connected to the mixing tube to modify a flow direction of the exhaust gas, and
a first outlet from the flow diverter to provide the exhaust gas to the aftertreatment module.

* * * * *